United States Patent Office 3,563,769
Patented Feb. 16, 1971

3,563,769
METHOD OF JELLING ARTIFICIALLY SWEETENED FOOD PRODUCTS
Louis J. Horn, Wilmette, Ill., assignor to Kraftco Corporation, New York, N.Y., a corporation of Delaware
No Drawing. Filed Aug. 9, 1967, Ser. No. 659,305
Int. Cl. A23l 1/04
U.S. Cl. 99—131                                                      9 Claims

ABSTRACT OF THE DISCLOSURE

An artificially sweetened gelled food product is produced wherein gelling is effected with an improved gelling agent. The gelling agent is a polysaccharide gum extracted from seaweed, in combination with a high methoxyl pectin. The seaweed extract is selected from those seaweed extracts which provide clear, firm water gels with a mouth feel similar to that of conventional jellies containing sugar and gelled with pectin. Carrageenan and eucheuman extracts are preferred.

---

The present application is related to an artificially sweetened food product, and more particularly is related to an artificially sweetened jelly and to a method for producing same.

Artifically sweetened jellies are desirable food products for those persons with dietary restrictions who must limit their normal intake of sugar, or for those persons who desire a low calorie diet. However, it has been found difficult to provide suitable gelling properties for jelly which has been artificially sweetened. Conventionally, jellies containing sucrose have been made with pectin as the gelling agent. However, pectin requires a combination of sugar and acid to fully utilize its gelling properties and obtain a product with good appearance and texture.

It has been found that those pectins having a low degree of methylation (DM) in combination with calcium ions are effective in jelly compositions containing artificial sweetening materials. While such low methoxyl pectins provide a suitably gelled or thickened artificially sweetened jelly, the jelly product tends to have a very cloudy or opaque appearance that is quite different from the clear, glossy appearance associated with conventional jellies made with sugar and pectin having a high DM.

In addition, in using low methoxy pectin, boiling is required to deaerate the product and prevent fast gelling, and the low methoxy pectin tends to burn onto the jacket of the kettle in which the jelly mixture is boiled. Consequently, a high degree of agitation is required during processing of artificially sweetened jelly containing low methoxy pectin to minimize this burn on.

It would be desirable to provide an artificially sweetened jelly with the clear glossy appearance associated with jellies made from sugar. It would also be desirable to provide a process for producing artificially sweetened jellies wherein the product does not tend to burn onto the jacket of the kettle wherein it is processed.

Therefore, it is a principal object of the present invention to provide an artificially sweetened jelly with a clear glossy appearance and a method for making same. It is another object of the present invention to provide a gelling agent for use in making artificially sweetened jelly which provides a clear jelly product. It is a further object of the present invention to provide a process for making artificially sweetened jelly wherein the product does not tend to burn onto the kettle wherein it is processed. It is a still further object of the present invention to provide an artificially sweetened jelly with improved flavor and color.

These and other objects of the present invention will become more clear from the following detailed description.

Generally, in accordance with various of the features of the present invention, an artificially sweetened gelled food product is produced wherein gelling is effected with an improved gelling agent. More particularly, the gelling agent of the present invention is a polysaccharide gum extracted from seaweed and in combination with pectin. In a process for manufacturing artificially sweetened jelly with the gelling agents of the present invention, it is not necessary to boil the jelly ingredients, and artificially sweetened jelly can be produced without burning of the jelly product onto the sides of a process kettle.

The seaweed extract used in the polysaccharide gum combination of the present invention is selected from those seaweed extracts which provide clear, firm water gels with a mouth feel similar to that of conventional jellies containing sugar and gelled with pectin containing a high degree of methylation. Carrageenan and eucheuman extracts are preferred. Particularly preferred are those carrageenan extratcs derived from *Chondrus crispus* and *Gigartina stellata*. A eucheuman extract derived from *Euchema spinosum* may also be used. Carragenan from *Chondrus crispus*, commonly referred to as Irish moss, is preferred because of its ready availability and its low cost.

It is preferred that the seaweed extract be recovered from an extraction process by precipitation with a soluble alcohol or ketone, such as isopropanol, ethanol, methanol or acetone. This provides an extremely pure polysaccharide extract which provides maximum clarity in the finished jelly product.

The carrageenan may be further treated by ion exchange to increase the cation content. It is well known that the gelling strength of carrageenan is related to the level of certain cations, such as potassium, sodium, or calcium, associated with carrageenan. However, since cations may be supplied by other jelly ingredients, such treatment is not essential. When grape jelly is produced by the described method, it is preferred to provide at least part of the total level of cations by maintaining the potassium ion level of the grape concentrate in the preferred range of 1200 to 3500 p.p.m. of potassium. For other types of jelly, such as apple, cations may be added to provide the desired level of cations of from about 1200 to about 3500 p.p.m.

The carrageenan is used at levels of from about one percent to about three percent by weight based on the finished jelly product. A level of about 1.5 percent by weight is preferred. While higher levels of carrageenan may also be used, no further advantage is obtained.

Pectin is primarily used in the gelling agent combination of the present invention to limit the breakdown of the carrageenan in the finished jelly product. Carrageenan is readily depolymerized and loses its gelling power when the pH of the gelled system is below about 4.0, as occurs in most jelly products. The pectin serves to stabilize the carrageenan and prevent the depolymerization and subsequent loss of gel structure through syneresis. The pectin of the present gum combination preferably has a degree of methylation of at least about 45 percent, i.e., is not a low methoxy pectin. It is, of course, well known that pectins containing a high degree of methylation (above about 45 percent) do not form gels in an artificially sweetened system. Such high methoxy pectin would require sugar and acid to provide a gel structure.

The high methoxy pectin is used at a level of from about 10 percent to about 50 percent by weight based on the levels of carrageenan. At pectin levels below about 10 percent of the level of carrageenan the stabilizing effect is insufficient and the carrageenan may be depolymerized after addition to the jelly mixture. While pectin levels above 50 percent of the level of carrageenan may be used, no additional benefit is attained.

The use of the gum combination of the present invention as a gelling agent eliminates the problems of burn-on encountered when low methoxy pectin is used as a gelling agent for artificially sweetened jellies. This elimination of burn-on permits the use of processing temperatures below boiling, since boiling is not required for agitation of the mixture during processing to prevent burn-on. Such low temperature processing further enhances the flavor of the finished jelly product in that volatile flavor and aroma components are less likely to be driven off.

Since the carrageenan is particularly susceptible to depolymerization in a heated acid environment, it is preferred to maintain the carrageenan as a separate solution prior to addition of the carrageenan into the mixture of jelly ingredients. It is preferred to make such addition of carrageenan at as late a point in the process as is practical. A preferred method is to introduce the carrageenan as a solution into a flowing stream of jelly ingredients just prior to packaging of the jelly ingredients in suitable containers. The carrageenan, however, is not affected by relatively high temperatures under basic conditions, and it is preferred to maintain solutions of carrageenan at a temperature of at least about 160° F. to prevent a weak gel from forming during storage of the carrageenan in solution.

The following examples further illustrate various features of the present invention but are intended to in no way limit the scope of the applicaation, which is defined in the appended claims.

EXAMPLE I

Apple jelly was prepared using the gum combination of the present invention by the following process:

A carrageenan solution was prepared by slowly pouring dry carrageenan into water which had been heated to 185° F. and which was agitated during the addition of carrageenan. After thoroughly mixing, the solution was held at 170° F. to prevent a weak gel from forming. The carrageenan used was extracted from Irish moss and was recovered from the extraction process by alcohol precipitation and subsequent drying.

342 pounds of water were then added to a jacketed kettle equipped with an agitator and steam was introduced into the jacket. 214.2 pounds of 47° Brix apple concentrate and 62.5 pounds of a solution containing apple pectin at a level of four percent by weight were then added and the mixture was heated to 170° F. The apple pectin had a degree of methylation of 65 percent. 5.0 pounds of sodium cyclamate and 2.8 ounces of sodium saccharin were then dissolved in 40 pounds of water and the mixture was added to the jacketed kettle. 1.25 pounds of potassium citrate and 0.75 pound of potassium sorbate were then dissolved in 15 pounds of water and the mixture was added to the jacketed kettle. 2.44 pounds of potassium chloride was dissolved in 20 pounds of water and the mixture was added to the jacketed kettle. One pound of anhydrous citric acid, diluted with an equal amount of water, and 5.0 pounds of 150 fold apple essence were then added to the jacketed kettle.

The above mixture was then stirred and the temperature was brought back to 170° F. To the mixture was then added 290 pounds of the carrageenan solution which had been previously prepared. The pH was then checked and adjusted to 3.60. The percent solids, as measured by ° Brix, was then adjusted to 12.2° by the addition of water. The apple jelly mixture was then heated to 185° F. and was filled into jars at a temperature of 160° F. or above. The jars were capped and were cooled at a rate sufficient to prevent trapping air bubbles in the jelly.

An artificially sweeted apple jelly product was produced by the above procedure which had extremely good clarity when compared to apple jelly produced in a conventional manner with sugar and high methoxy pectin. The process used to manufacture the artificially sweetened apple jelly eliminated the problem of burn-on on the sides of the mixing kettle usually encountered when producing artificially sweetened jelly.

EXAMPLE II

Artificially sweetened grape jelly was produced with the gelling agent of the present invention by the following process:

A carrageenan solution was prepared in accordance with the procedure of Example I.

77.5 pounds of water and 369.8 pounds of 29° Brix grape juice concentrate were added to a jacketed kettle equipped with an agitator and steam was supplied to the jacket. 62.5 pounds of a solution containing apple pectin at a level of four percent by weight (65 percent degree of methylation) were then added to the kettle and the mixture was heated to a temperature of 170° F. 5.0 pounds of sodium cyclamate and 2.8 ounces of sodium saccharin were dissolved in 40 pounds of water and the mixture was added to the kettle. 1.25 pounds of potassium citrate and 0.75 pound of potassium sorbate were dissolved in 15 pounds of water, and the mixture was added to the kettle. 20 pounds of a 25 weight percent sodium hexametaphosphate solution were added to the kettle and the temperature was equalized at 170° F. 33 pounds of 25 fold grape essence were then added and the pH was adjusted to 3.50. The solids content, as measured by ° Brix, was adjusted to 13.7° by the addition of water, and 375 pounds of the previously prepared carrageenan solution was added.

The mixture was heated to a temperature of 185° F. and was packaged into jars. The jars were capped and cooled at a rate sufficient to prevent trapping air bubbles in the jelly.

An artificially sweetened grape jelly was obtained with a clarity comparable to that of grape jelly produced in a conventional manner with sugar and high methoxy pectin. No burn-on problems were encountered during processing of the artificially sweetened grape jelly ingredients.

What is claimed is:

1. A method for gelling jelly type food products containing artificial sweeteners which comprises providing an aqueous dispersion of food materials, heating said aqueous dispersion to a temperature less than boiling, adding to said aqueous dispersion a combination of a seaweed extract and pectin, said seaweed extract being selected from carrageenan or eucheuman and said pectin having a degree of methylation of at least about 45 percent, and cooling said dispersion, said pectin being present in an amount sufficient to stabilize said seaweed extract so as to prevent depolymerization of said seaweed extract.

2. A method in accordance with claim 1 wherein said seaweed extract is recovered from an extraction process by precipitation with a water soluble alcohol or ketone.

3. A method in accordance with claim 1 wherein said seaweed extract is carrageenan from *Chondrus crispus*.

4. A method in accordance with claim 1 wherein said seaweed extract is present at a level of from about one percent to about four percent by weight of the food product and wherein said pectin is present at a level of from about 10 percent to about 50 percent by weight of the seaweed extract.

5. A method in accordance with claim 1 wherein said aqueous dispersion of food materials is adjusted to a cation level of from about 1200 to about 3500 p.p.m.

6. The method of claim 5 where the cations are selected from sodium, calcium or potassium or mixtures thereof.

7. A method in accordance with claim 1 wherein a solution of said seaweed extract is added to said aqueous dispersion.

8. A method in accordance with claim 7 wherein said solution of seaweed extract is maintained at a temperature sufficient to prevent gelling of said solution of seaweed extract prior to said addition.

9. A method in accordance with claim 7 wherein said solution of seaweed extract is maintained at a temperature above about 160° F. so as to prevent gelling of said solution of seaweed extract prior to said addition.

References Cited

UNITED STATES PATENTS 2,876,101   3/1959   Bliudzuis et al. .......... 99—132

OTHER REFERENCES

Whistler, Industrial Gums, Academic Press, New York, 1959, pp. 84, 85, 89, 106, 110.

RAYMOND N. JONES, Primary Examiner

J. M. HUNTER, Assistant Examiner

U.S. Cl. X.R.

99—132